(12) United States Patent
Howe et al.

(10) Patent No.: US 8,070,904 B2
(45) Date of Patent: Dec. 6, 2011

(54) METHOD OF MAKING A BODY PART OR CHASSIS PART OF A MOTOR VEHICLE

(75) Inventors: Christian Howe, Paderborn (DE); Johannes Böke, Blomberg (DE); Wilfried Rostek, Paderborn (DE); Bernd Wohletz, Meitingen (DE)

(73) Assignees: Benteler Automobiltechnik GmbH, Paderborn (DE); SGL Carbon AG, Wiesbaden (DE)

( * ) Notice: Subject to any disclaimer, the term of this patent is extended or adjusted under 35 U.S.C. 154(b) by 905 days.

(21) Appl. No.: 12/001,487

(22) Filed: Dec. 11, 2007

(65) Prior Publication Data

US 2008/0156425 A1      Jul. 3, 2008

(30) Foreign Application Priority Data

Dec. 11, 2006   (DE) .......................... 10 2006 058 602

(51) Int. Cl.
*B29B 1/00*          (2006.01)
(52) U.S. Cl. ........................ 156/245; 156/242
(58) Field of Classification Search .................. 156/245, 156/242

See application file for complete search history.

(56) References Cited

U.S. PATENT DOCUMENTS

| 3,939,024 | A | * | 2/1976 | Hoggatt | 156/242 |
| 5,209,804 | A | * | 5/1993 | Trudeau | 156/364 |
| 2002/0164485 | A1 | * | 11/2002 | Martin | 428/413 |
| 2006/0020074 | A1 | * | 1/2006 | Asada et al. | 524/494 |
| 2006/0182949 | A1 | * | 8/2006 | Salnikov et al. | 428/327 |

FOREIGN PATENT DOCUMENTS

| DE | 30 11 336 | A1 |   | 10/1981 |
| DE | 10 2004 003 190 |   |   | 9/2005 |
| EP | 743174 | A2 | * | 11/1996 |
| JP | 06262723 | A | * | 9/1994 |

* cited by examiner

*Primary Examiner* — Jeff Aftergut
*Assistant Examiner* — Jaeyun Lee
(74) *Attorney, Agent, or Firm* — Henry M. Feiereisen; Ursula B. Day

(57) ABSTRACT

In a method of making a body part or chassis part of a motor vehicle, several pre-impregnated fiber materials (prepregs) are stacked on top o one another, with an outermost prepreg intended for attachment to a metallic base body being provided with an adhesive. The stacked prepregs are then shaped into a three-dimensional preform which is then compressed with the base body in a press tool for bonding the preform with the base body and allowing the adhesive to cure, thereby producing a joined structure which is allowed to cure.

9 Claims, 1 Drawing Sheet

METHOD OF MAKING A BODY PART OR CHASSIS PART OF A MOTOR VEHICLE

CROSS-REFERENCES TO RELATED APPLICATIONS

This application claims the priority of German Patent Application, Serial No. 10 2006 058 602.6, filed Dec. 11, 2006, pursuant to 35 U.S.C. 119(a)-(d), the content of which is incorporated herein by reference in its entirety as if fully set forth herein.

BACKGROUND OF THE INVENTION

The present invention relates, in general, to a method of making a body part or chassis part of a motor vehicle.

Nothing in the following discussion of the state of the art is to be construed as an admission of prior art.

Fiber plastic composite parts can be joined to a metal structure through cathodic electrophoretic enamelling using various one-component epoxy resin adhesive systems. Common to all these adhesive systems is their limitation as far as energy absorption and stress resistance of the adhesive are concerned. Also the tensile shear resistance of these types of adhesive systems could be problematic as a result of varying thermal expansion coefficients when joining a fiber plastic composite with steel. In particular the automobile industry demands high quality of adhesives, especially when body parts of motor vehicles are involved that are subject to high stress.

German Offenlegungsschrift DE 10 2004 003 190 A1 discloses a structural assembly for a motor vehicle body in shell construction having an outer shell and an inner shell, with the assembly being reinforced by at least one reinforcement member. The reinforcement member is made of a fiber-reinforced plastic and bonded in flat contact with the shell. The use of carbon fiber reinforced plastics (CFRP) is hereby considered especially beneficial. The actual bonding is realized by means of epoxy adhesive which is so formulated as to cure during painting of the body in the oven. As result, the bonding does not break down even at high temperatures as encountered during body painting. In contrast thereto, the curing process in a two-component adhesive occurs quickly so that the adhesive is already fully cured before the paintjob is executed so that these types of adhesives break down during the paintjob.

It would therefore be desirable and advantageous to address this problem and to obviate other prior art shortcomings.

SUMMARY OF THE INVENTION

According to one aspect of the present invention, a method of making a body part or chassis part of a motor vehicle includes the steps of stacking several pre-impregnated fiber materials (prepregs), with an outermost prepreg intended for attachment to a metallic base body being provided with an adhesive, shaping the stacked prepregs into a three-dimensional preform, compressing the preform and the base body in a press tool for bonding the preform with the base body and allowing the adhesive to cure, thereby producing a joined structure, and allowing the structure to age for curing.

The present invention resolves prior art problems by stacking several fiber materials, also called prepregs, which have been pre-impregnated with a curable synthetic resin. The outermost prepreg that is to be joined to at least one base body may hereby be impregnated with adhesive or coated on the outside with adhesive. The inner prepregs, on the other hand, are only pre-impregnated with the synthetic resin. The plurality of prepregs may be trimmed to size either before or after being stacked to conform to the geometry of the at least one base body, and then shaped into a three-dimensional preform. The preform is placed upon the base body and then pressed onto the base body in a press tool where the preform is bonded and the adhesive cures. Thereafter the joined parts undergo aging to cure.

The base body may involve various structures such as B-pillar, sill, roof side frame, or bumper cross beam. In particular the use of the base body as B-pillar is beneficial because this part is subject to high stress in the event of a crash from the side. As the use of a fiber-reinforced plastic for a metallic base body can be tailored to a specific situation, different standards in North America and in the European Union can thus be satisfied. It is hereby only necessary to vary the base body through incorporation of appropriate reinforcement parts.

As a result of the stress encountered in the event of a side crash, significant tensile stress is experienced in the direction of sill/roof frame in midsection of the B-pillar. To be able to directly transfer tensile stress into the fiber-reinforced plastic, the application of adhesive for joining the fiber-reinforced plastic with the base body, i.e. the steel or aluminum structure of the B-pillar, is carried out in flat contact or partially, so as to produce a composite part comprised of a reinforcement member and the structure to be reinforced, i.e. base body. A fiber plastic composite is especially suited to transmit high stress, when having embedded therein carbon fibers. Suitably the fibers are aligned unidirectionally in a sheet.

The joining technique, i.e. bonding, may involve the use of one-component adhesive systems as well as two-component adhesive systems. Unlike one-component systems, two-component systems can be bonded to suit the stress situation at hand. An example of a two-component system includes two-component polyurethane adhesive which can be better adjusted than one-component systems as far as energy absorption and maximum force level are concerned. The use of two-component polyurethane adhesive is also beneficial because in comparable crash characteristics the problem with respect to thermal expansion can be easily compensated through thicker and more flexible adhesive systems.

The present invention thus realizes a combination of fiber plastic composite and steel which can be subjected to a cathodic electrophoretic enamelling process and can have different properties to suit energy absorption and force resistance and remains unaffected by different thermal expansions of the parts being joined.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The described embodiments are to be understood as illustrative of the invention and not as limiting in any way.

Figure 1:
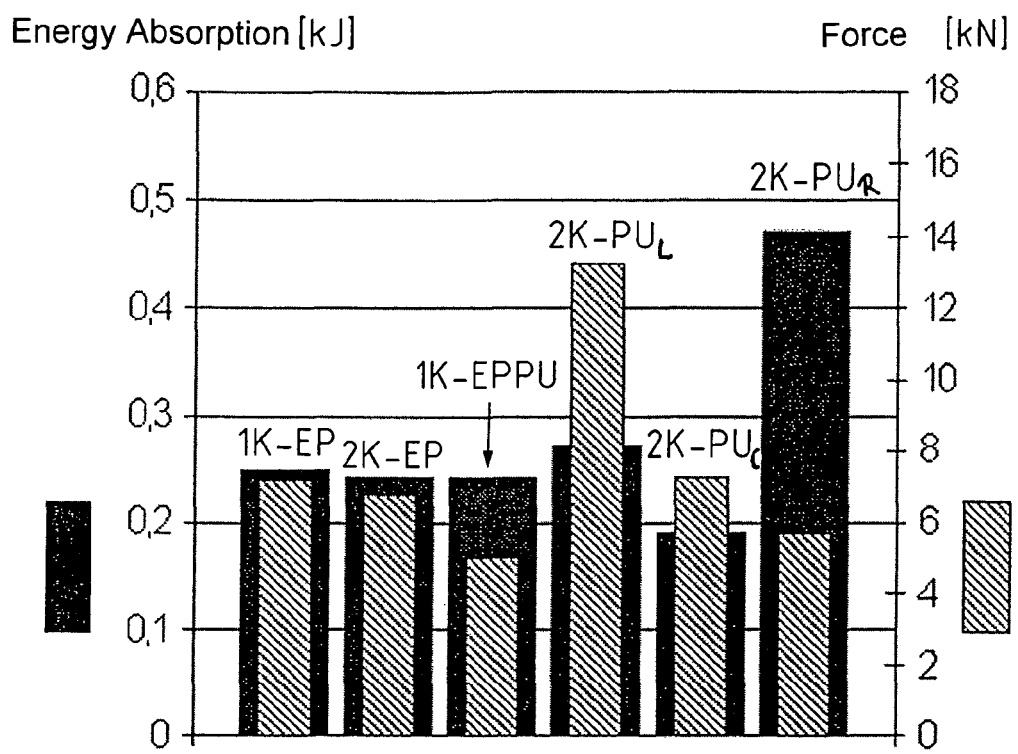
FIG. 1 is a graph showing a comparison between various epoxy adhesives and two-component polyurethane adhesive systems with respect to energy absorption and force resistance.

Turning now to the drawing, and in particular to FIG. 1, there is shown a graph depicting a comparison with respect to energy absorption, illustrated as solid black blocks, and force resistance, illustrated as shaded block, between two epoxy adhesives, labeled 1 K-EP (one-component epoxy), 2K-EP (two-component epoxy), and an epoxy polyurethane combination 1K-EPPU (one-component epoxy polyurethane), as well as three differently formulated two-component polyurethane adhesive systems, labeled $2K\text{-}PU_L$, $2K\text{-}PU_C$, $2K\text{-}PU_R$. As the graph shows, the capability of the epoxy adhesives to absorb energy stays relative constant. In other words, epoxy adhesives are not reliable enough to suit the stress profile especially in the area of a B-pillar. In contrast thereto, the two-component polyurethane adhesives have a far greater flexibility. As the graph shows, the rightmost two-component polyurethane adhesive $2K\text{-}PU_R$ exhibits a very high energy absorption capability that is beneficial for many applications. However, this adhesive shows a force resistance or stress resistance which is comparably smaller than the other two examples of a two-component polyurethane adhesive $2K\text{-}PU_L$, $2K\text{-}PU_C$.

The two-component polyurethane adhesive $2K\text{-}PU_L$ has a formulation that is able to absorb great forces while still exhibiting a high capability to absorb energy. This may be beneficial for some other applications. Even the one component epoxy polyurethane 1K-EPPU mixture system exhibits a certain strength level that may be applicable for some applications in the area of body and chassis parts, even though two-component polyurethane adhesive systems are significantly more varied and more flexible to suit the construction of a body or chassis part to the market situation at hand.

Figure 2:
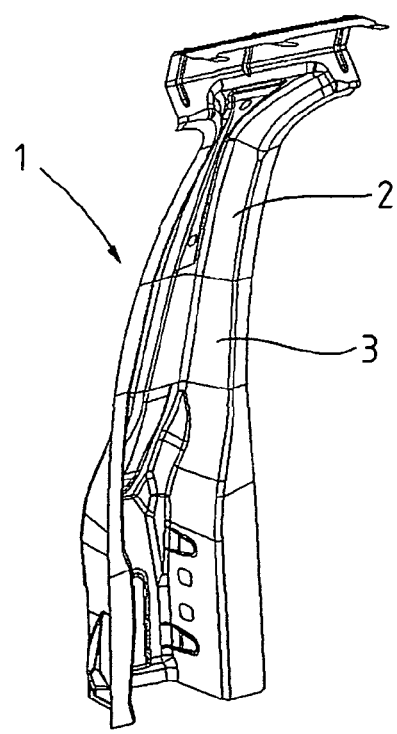
FIG. 2 is an isometric illustration of an exemplary B-pillar embodying the subject matter of the present invention.

Referring now to FIG. 2, there is shown an isometric illustration of an exemplary B-pillar of a motor vehicle, generally designated by reference numeral 1 and embodying the subject matter of the present invention. The B-pillar 1 has a metallic base body 2 and a reinforcement member 3 which is made of a fiber plastic composite and bonded partially with the metallic base body 2. The reinforcement part 3 is hereby made from several stacked prepregs, with the outermost prepreg facing the base body 2 being provided with an adhesive impregnation or with an outwardly pointing adhesive coat. After being trimmed to size to conform to the geometry of the base body 2, the prepregs are shaped into a three-dimensional preform, as shown in FIG. 2. The preform and the metallic base body 2 are then pressed upon one another in a two-part press tool, thereby bonding the preform with the base body 2. The thus joined structure is then removed from the press tool and allowed to cure.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of making a body part or chassis part of a motor vehicle, comprising the steps of:
    a) stacking several pre-impregnated fiber materials (prepregs), with an outermost prepreg intended for attachment to a metallic base body being provided with an adhesive;
    b) trimming the prepregs after step a) to conform to a geometry of the base body;
    c) shaping the stacked and trimmed prepregs into a three-dimensional preform;
    d) compressing the preform and the base body in a press tool for bonding the preform with the base body and allowing the adhesive to cure, thereby producing a joined structure; and
    e) allowing the structure to age for curing.

2. The method of claim 1, wherein the outermost prepreg is impregnated with the adhesive.

3. The method of claim 1, wherein the outermost prepreg is coated with the adhesive.

4. The method of claim 1, further comprising the step of bonding the structure to a further base body, with the preform sandwiched between the base bodies to interconnect the base bodies and assuming a reinforcement function.

5. The method of claim 1, wherein the preform is made of a fiber plastic composite.

6. The method of claim 1, wherein the preform is made of a carbon fiber plastic composite.

7. The method of claim 1, wherein the fiber materials have fibers aligned unidirectionally in a sheet.

8. The method of claim 1, wherein the adhesive is a two-component polyurethane adhesive.

9. The method of claim 1, wherein the base body is a member selected from the group consisting of B-pillar, sill, roof side frame, and bumper cross beam.

* * * * *